Oct. 9, 1951     A. E. JUNGE     2,570,245
METHOD OF SPRAYING TRANSPARENT COATINGS
Filed April 2, 1948

INVENTOR
ALBERT E. JUNGE

BY Olen E Bee
ATTORNEY.

Patented Oct. 9, 1951

2,570,245

UNITED STATES PATENT OFFICE 2,570,245

METHOD OF SPRAYING TRANSPARENT COATINGS

Albert E. Junge, New Kensington, Pa., assignor to Pittsburgh Plate Glass Co., a corporation of Pennsylvania Application April 2, 1948, Serial No. 18,610

2 Claims. (Cl. 117—105)

This invention relates in general to an improved method of spraying liquids, vapors and their mixtures. It is particularly directed to the spraying of electroconductive films on a glass or other transparent refractory base in order to minimize or eliminate haze.

The atomizing spray nozzle has been used for many years to spray an indescribable number of liquids and vapors. Virtually all of the paints, enamels, lacquers, varnishes and other organic protective coatings which are applied in mass production operations are applied by using the familiar "spray gun." Likewise in many industrial processes less familiar liquids are frequently applied under pressure from spray nozzles. For example, metal surfaces may be treated with corrosion inhibiting phosphate coatings such as the crystalline orthophosphates or the glassy phosphates, by means of high pressure sprays. Countless other industrial and agricultural applications employing the conventional spraying processes are well known.

Although the use of a single easily movable spray nozzle is satisfactory for certain purposes, such as in the spraying of paints or enamels on broad expanses of surface where the thickness of the coating is not particularly critical as on automobile bodies, refrigerators, etc., there are many coating operations which require an extremely uniform coating application.

A particularly difficult problem of coating is encountered in the production of electroconductive films upon various articles, particularly ceramic or refractory articles such as glass and more especially plate or window. Such coated articles are useful for various purposes such as for viewing closures in automotive vehicles. In such uses, an electric current is passed through this film to elevate the temperature whereby accumulations of snow, ice or moisture thereon are prevented or minimized to a great extent. It is essential that the coating be uniform since it acts as a continuous metallic resistance unit in the electrical circuit. If the film is not uniform in thickness, the desired effect is considerably diminished since "hot spots" and "cold spots" occur and the coated glass is of little value as a viewing closure under adverse climatic conditions.

In the treatment of a glass base whereby an electroconductive film is deposited on the surface, certain compounds such as stannic chloride or other hydrolyzable tin compounds are dissolved in water with other ingredients which serve as coating aids and the solution is sprayed through the nozzle onto the heated glass base. A serious problem which has been encountered in this operation resides in the fact that many of the coated articles thus produced exhibit considerable haze and poor transparency. The exact cause or causes of such haze formation is not known. However, the problem is particularly serious where relatively thick coatings are necessary. Coated windshields or other articles which have been prepared were in some instances found to be so hazy that they could not be used for their desired purpose and had to be discarded. I have found that transparent films which possessed the required conductivity and which at the same time were relatively free from haze could be produced by alternately heating the glass, spraying a thin film, reheating and respraying the glass with a second thin film and continuing this operation until a film of the desired thickness had been built up. However, repeated spraying and heating requires extra handling and consumes much time, hence it is not particularly feasible in commercial production.

In accordance with my invention I have discovered that the repeated sprayings which were originally considered essential to the production of a haze-free uniform coating are no longer required. A glass or other refractory base is provided with a transparent electroconductive coating by spraying an aqueous solution of a metal compound such as stannic chloride, stannic iodide, cadmium bromide, indium trichloride and numerous other metal compounds in conjunction with certain other materials which promote the deposition of the coatings. The coating is applied to the base while the base is heated. The spraying operation is conducted by horizontally directing a pair of sprays of the compound at an angle of less than 180° toward a point of intersection and simultaneously directing a third nozzle intermediate the others at the point of intersection thereby forcing the atomized spray toward the glass base in a narrow band. The heated base is moved through the path of the spray at a uniform rate of travel whereupon a uniform film is deposited on the surface. My process can be more readily understood by referring to the accompanying drawing in which it is diagrammatically illustrated in Figs. 1 to 3 inclusive.

In the embodiment illustrated, a pair of nozzles 10 and 11 are mounted by suitable means (not shown) so as to impinge at a focal point A. A further nozzle 12 is mounted between the other nozzles and directed to the focal point. The angle between the two nozzles 10 and 11 may be varied to a considerable degree being less than 180° at all events and generally of the order of 30° to 60°.

The stannic chloride or similar solution is delivered to each of the nozzles 10 and 11, under a pressure of from about 10 to about 50 p. s. i. from nozzle 12 which is normally disposed at a middle point between nozzles 10 and 11 and is directed toward the focal point A thereby essentially bisecting the angle of spray formed by nozzles 10 and 11. As a consequence of the air blast from nozzle 12 the thin spray band is forced rapidly outwardly from the focal point. Air pressures normally impressed upon each of the nozzles are usually but not necessarily equal.

While the use of air in the central nozzle is not absolutely necessary in the spraying operation, it appears that its use promotes the deposition of haze-free films. Although the exact reason for this beneficial result is not known, it is believed that the blast of air forces the coating solution against the glass base so rapidly that any haze-forming chemical reaction of the solution is minimized to a considerable degree and in some instances virtually eliminated. The spray nozzles which are used should preferably be capable of delivering an oval type spray, and they are so mounted as to cause the vertical major axis of each of the oval sprays to be essentially in the vertical position.

Figure 1:
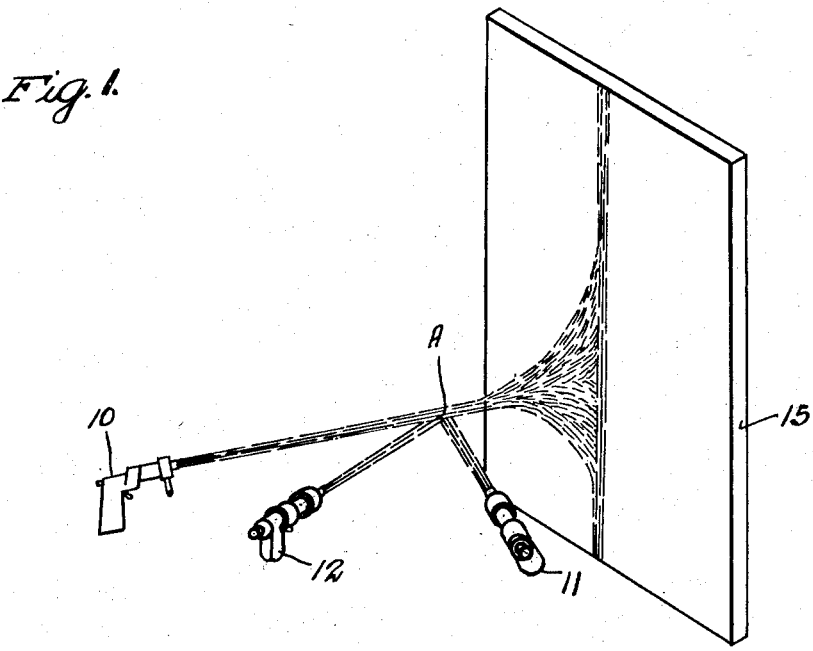
Fig. 1 is a diagrammatic perspective view of an especially effective method of applying a coating composition to a plane surface.

In the coating of glass or other ceramic or vitrified surfaces with an electroconductive material such as a tin compound, the sprays are started thereby causing an essentially vertical band of liquid and/or vapor containing the tin compound to be directed to a central area. A glass sheet which has been heated in a heating chamber preheated to the required temperature above about 500–600° F., preferably about 800 to 1250° F. is then held in a vertical position and moved transversely of the spray. As this heated sheet passes through the elongated narrow band of spray, the spray impinges against the exposed surface and the tin oxide or other film is deposited upon the sheet. A substantially continuous coating upon the exposed surface of the sheet is produced simply by moving the sheet edgewise across the path of the spray so that it strikes substantially all areas of the sheet during passage of the sheet therethrough. In general, the width of the sheet is adjusted to be accommodated to the length of the spray so that the sheet will be sprayed substantially equally along its entire width. When necessary, several banks of nozzles such as illustrated in Fig. 1 may be disposed one above the other to insure complete coating of an unusually wide sheet.

In a single operation, this process effectively deposits tin oxide or other electroconductive coating upon a glass or similar base having the required transparency and conductivity. Consequently, recourse to multiple coating operations, previously thought to be essential, has been eliminated. However, if desired, this method of coating may be modified to permit multiple spraying by passing the sheet through the spray several times, by moving the sheet back and forth through the spray or by holding the sheet stationary and moving the spray back and forth over the sheet. The terms in the claims "moving the base through the path of the spray" or equivalent terms are intended to cover any relative movement of the path and the spray regardless of whether the spray moves over the surface of a stationary base or the base is passed through a stationary path of spray.

As previously stated, my invention has been found to be particularly valuable when used in the coating of window and plate glass which are made of lime-soda glass. Such glass usually has the following composition:

| | Percent by weight |
|---|---|
| $Na_2O$ | 10 to 15 |
| CaO | 5 to 15 |
| $SiO_2$ | 70 to 75 |
| MgO | 2 to 10 |

A typical lime-soda glass used as window glass has the following composition:

$SiO_2$, 71.38 percent by weight (usual variation 71 to 73% by weight)
$Na_2O$, 12.79 percent by weight (usual variation 12 to 14% by weight)
CaO, 9.67 percent by weight (usual variation 8 to 11% by weight)
MgO, 4.33 percent by weight
$Na_2SO_4$, 0.75 percent by weight
NaCl, 0.12 percent by weight
$Fe_2O_3$, 0.15 percent by weight
$Al_2O_3$, 0.81 percent by weight When lime-soda glass of this typical formula is coated with electroconductive films by my improved spraying methods according to this invention, the films have high transparency, a resistance per unit square below 500 ohms and generally less than 150 ohms and a haze factor below 5 percent.

The expression of resistance in terms of ohms per unit square is a convenient means of expressing the resistance of thin films; this resistance in fact being the specific resistivity of the film divided by the average thickness of the film within the unit square.

The haze factor is measured by a method designated "A Tentative Method of Industry for Transparent Plastics by Photoelectric Cell," described in the publication "A. S. T. M. Standards," 1944, part 3, pages 1653–1655, American Society for Testing Materials, New York.

As previously stated, the exact cause of haze in films of this character has not been determined with absolute certainty. It is probable that a number of factors are involved in causing the undesirable formation. For example, premature decomposition of stannic chloride or similar compound whereby tin oxide is formed at a point spaced from the hot glass sheet and subsequently is swept onto the sheet is at least one cause. It has been noted that haze is much less likely to develop where the conversion of stannic chloride or similar compound to the corresponding metal oxide occurs immediately adjacent to or on the hot glass surface.

The thickness of the coatings deposited by my spraying method will vary depending upon the type of solution employed, the temperature of the glass and the time of contact between a unit area of the glass and the spray. Generally, the thickness will vary between about 50 to 1000 millimicrons. The color characteristics of the coating are determined to a substantial degree by the thickness of the coating. Colorless coatings may be obtained by the use of compounds which deposit tin oxide or similar coatings which are below about 50 to 60 millimicrons in thickness. Thicker coatings having a thickness of 75 to 1000 millimicrons possess a color depending upon the exact thickness. This color is due to the reflection of certain bands of light at particular coating thicknesses whereby interference colors are produced. Where the thickness of the coating is irregular different colors will be reflected at different areas of the coating and iridescence is produced.

The invention has been described with special reference to the use of stannic chloride as the tin compound for production of the electroconductive film. Stannic chloride is particularly valuable since it may be used either in aqueous medium or in the vapor state to produce films which visibly appear to be flawless. Other stannic compounds such as stannic bromide, $SnBr_3Cl$, $SnBrCl_3$, $SnCl_2I_2$, $SnI_4$, stannic sulphate, stannic phosphate, stannic nitrate, or stannous salts such as stannous acetate, stannous oxalate, stannous chloride, stannous nitrate, and stannous tartrate may be used. Organic tin compounds have been found useful, including those having the structure $R_mSnX_n$ where R is a monovalent aryl, aliphatic or arylaliphatic radical linked to the tin atom through carbon and X is another monovalent aryl, aliphatic or arylaliphatic radical linked to the tin atom through carbon or is a radical such as hydride, hydroxyl, chloride, bromide, iodide, etc. and the sum of $m$ and $n$ is 4, such as tetra ethyl tin, tetra methyl tin, tetra-n-heptyl tin, tetra-di-amyl tin, tetra benzyl tin, ethyl chlorostannic acid and diethyl tin oxide. Moreover, other tin compounds such as diphenyl tin, diethyl tin, stannic bis acetylacetone dichloride or dibromide, etc. may be used.

Generally it is desirable to use tin compounds which are liquid or those which may be vaporized readily or dissolved in solvents such as water or organic solvents such as benzene, xylene, toluene, acetone, methanol, ethanol, methylethyl ketone, etc. so that the tin compound may be applied to the base as a homogeneous liquid or solution. Such solutions normally contain at least 10 to 50 parts by weight of tin compound per 100 parts by weight of solution.

Other metal oxide films may be deposited in place of the tin oxide coatings. Cadmium bromide, indium chloride, cadmium acetate, cobalt nitrate, thalium nitrate, antimony pentachloride being typical examples. Each compound may represent the sole source of metal ion in a solution or two or more of them may be used in preparing the solution.

*Example*

Figure 2:
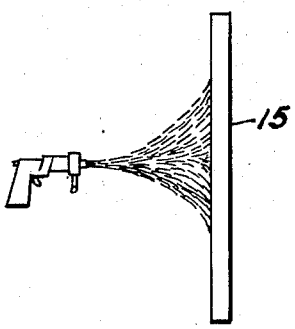
Fig. 2 is a diagrammatic side elevation illustrating the coating method shown in Fig. 1
Figure 3:
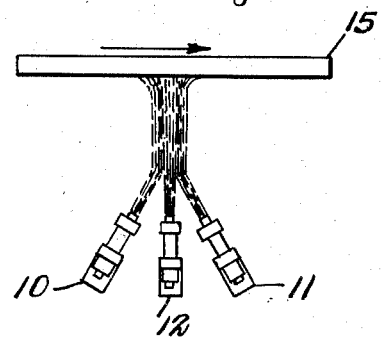
Fig. 3 is a diagrammatic plan view of the method shown in Fig. 1.

Three "De Vilbiss" spray guns capable of spraying an atomized spray of oval cross section were mounted in a row so that their nozzles were directed substantially in a horizontal plane toward a focal point essentially as shown in Figs. 1 to 3 inclusive. The two outer guns were directed so that the angle between the nozzles was approximately 30 degrees. The middle gun was mounted so that the nozzle was directed toward the focal point of the outer nozzles and approximately bisected the angle between the two outer nozzles. Each of the nozzles was mounted so that the end of the nozzle was approximately 11 inches from the focal point.

A sheet of glass 17 inches x 25 inches x 7/64 inch was vertically suspended with the narrow sides being in a horizontal plane and was heated in a furnace chamber at a temperature of 1150° F. for 3 minutes. The two outer guns were filled with a solution prepared by mixing the following components in the proportions specified:

Stannic chloride pentahydrate_____grams__ 900
Methanol _____milliliters__ 63
Phenyl hydrazine_____grams__ 21
Dioctyl sodium sulfosuccinate solution [1]
　　　　　　　　　　　　　　milliliters__ 30

[1] This solution consisted of:
Dioctyl sodium sulfosuccinate_____grams__ 10
Methanol _____milliliters__ 45
Water _____do____ 45

The middle spray gun was left empty. All three guns were connected to a source of compressed air, the air pressure imposed in each gun being about 80 pounds per square inch. Immediately after the heating period the glass sheet was held vertically with its front face perpendicular to the middle nozzle and was moved across the spray so that the guns were directed at a point midway between the top and bottom of the sheet. The glass sheet was held approximately 4 inches from the focal point of the impinging sprays. Under these conditions a long thin band of spray was blown by the air blast of the middle gun against the hot glass surface forming a coating as the sheet moved across the spray.

The air blast from the middle nozzle caused extremely rapid movement of the spray toward the sheet whereby conversion of stannic chloride to tin oxide before the spray reached the glass was substantially minimized. Furthermore, the air blast from the central nozzle aided in creating a draft across the sheet toward the side edges thereof thus minimizing opportunity for fog created by the spray from contacting the sheet. The blast also rapidly removed excess and partially decomposed spraying solution from the surface of the sheet.

The rate of moving the sheet across the spray was such as to require approximately 6 seconds. During this period, approximately 20 cubic centimeters of solution was sprayed from each gun. Following the spraying operation, the sheet was tempered to a temper of appoximately one fourth that of full temper.

The resulting sheet of glass had a transparent iridescent tin oxide coating the resistivity of which was approximately 125 ohms per unit square. The thickness of the coating was approximately 350-400 millimicrons.

The foregoing is a typical example of the application of my novel spraying method in the coating of a lime-soda glass base with an electroconductive tin oxide film. As indicated heretofore, numerous other metal salts and mixtures of various metal salts may be used with or without a tin compound.

In the example it will be noted that certain organic compounds are present in the coating solution. These addition agents have been found essential to the production of suitable electroconductive films on a lime-soda glass base and when solutions of metal salts to which these agents have been added are sprayed by my novel method, uniform haze-free coatings are assured.

A wide variety of agents may be used to assist the production of a haze-free electroconductive oxide film according to my invention. Especially good results have been obtained using lower aliphatic alcohols containing up to 8 carbon atoms, particularly water soluble monohydric alcohols. Thus films having low resistivity and freedom from haze may be produced using stannic chloride in conjunction with methanol, ethanol, isopropanol, n-propanol, iso-butanol, n-butanol, tertiary butanol, the amyl and hexyl alcohols or the lower unsaturated alcohols such as allyl, methallyl, cotyl, 2-ethyl allyl, propargyl or beta methyl propargyl alcohols. Aryl or aralkyl alcohols such as benzyl alcohol or cinnamyl alcohol may be used. Other compounds which contain alcoholic groups including glycols, polyhydroxy alcohols, hydroxy acids containing hydroxy groups esterifiable by acids may be employed.

Numerous other carbon compounds which upon thermal decomposition yield elemental carbon or at least carbon in a lower state of oxidation than is carbon in carbon dioxide also are effective although many are somewhat less effective than methanol and similar alcohols. For example, organic hydrazines such as phenyl hydrazine, diphenyl hydrazine, methyl hydrazine, ethyl hydrazine or the corresponding hydrochlorides thereof have been found to be especially useful, particularly when employed in conjunction with alcohols such as methanol, ethanol, the propanols or butanols.

The amount of the addition agent which is used is capable of substantial variation depending upon the results desired. In general the amount of such agent which is used in conjunction with a tin compound is at least 0.01 to 0.1 mol per mol of tin compound. Small amounts, in fact even traces show an improvement both in conductivity and freedom from haze when the solutions are applied to the glass base by my spraying method, and such improvement increases to a maximum as the amount of addition agent is increased. However, it is quite rare to use more than 50 parts by weight of addition agent per part by weight of tin compound.

Electroconductive films of the type herein contemplated may be applied by my spraying process on various glass or refractory articles such as borosilicate glass, china, porcelain, mica, phosphate glass, stone, lead X-ray glass, silicon carbide, tungsten carbide, aluminum oxide, asbestos, glass fiber and various other bases including metals such as iron, copper, tungsten, etc. having melting points above 1050° F.

It should here be emphasized that my novel method of spraying through atomizing nozzles is not confined to the deposition of electroconductive films upon glass, and that the above mentioned description is only by way of example. Numerous other applications of the process will at once become apparent to those skilled in the art. For example, in the spraying of organic and inorganic protective coatings the process should find many applications. Lacquers, varnishes, synthetic resins, paints, vitreous enamels, corrosion inhibitors, oils, waxes and other products may be sprayed by my improved method.

Although the present invention has been described with reference to the specific details of certain embodiments thereof, it is not intended that such details shall be regarded as limitations upon the scope of the invention except insofar as included in the accompanying claims.

What is claimed:

1. In a method of providing a transparent refractory base with a transparent coating by spraying a metal compound upon the base while the base is heated above 500° F. but below the temperature at which the base is molten, the steps which comprise effecting the spraying operation by directing a pair of sprays of said compound at an angle of less than 180° toward a point of intersection whereby the sprays impinge, directing an air blast toward said point along a line which divides said angle, and moving the heated base through the path of the resultant spray.

2. In a method of providing a transparent refractory base with a transparent coating by spraying stannic chloride upon the base while the base is heated above 500° F. but below the temperature at which the base is molten, the steps which comprise effecting the spraying operation by directing a pair of sprays of stannic chloride at an angle of less than 180° toward a point of intersection, whereby the sprays impinge, directing an air blast toward said point along a line which divides said angle, and moving the heated base through the path of the resultant spray.

ALBERT E. JUNGE.

REFERENCES CITED

The following references are of record in the file of this patent:

UNITED STATES PATENTS

| Number | Name | Date |
|---|---|---|
| 1,881,345 | Beatty et al. | Oct. 4, 1932 |
| 2,136,024 | Schneider | Nov. 8, 1938 |
| 2,236,911 | Long | Apr. 1, 1941 |
| 2,255,189 | Robinson et al. | Sept. 9, 1941 |
| 2,293,822 | Haven | Aug. 25, 1942 |
| 2,355,186 | Tischer | Aug. 8, 1944 |
| 2,429,420 | McMaster | Oct. 21, 1947 |